(12) United States Patent
Chettouf et al.

(10) Patent No.: US 8,071,069 B2
(45) Date of Patent: Dec. 6, 2011

(54) PURIFICATION OF TITANIA

(75) Inventors: Abderrahmane Chettouf, Amsterdam (NL); Carolus Matthias Anna Maria Mesters, Amsterdam (NL); Gerardus Petrus Lambertus Niesen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1617 days.

(21) Appl. No.: 10/487,385

(22) PCT Filed: Aug. 9, 2002

(86) PCT No.: PCT/EP02/08920
§ 371 (c)(1),
(2), (4) Date: Feb. 20, 2004

(87) PCT Pub. No.: WO03/018481
PCT Pub. Date: Mar. 6, 2003

(65) Prior Publication Data
US 2004/0179995 A1    Sep. 16, 2004

(30) Foreign Application Priority Data
Aug. 22, 2001    (EP) ................................. 01307131

(51) Int. Cl.
*C01G 23/047* (2006.01)
(52) U.S. Cl. ...................................... 423/610
(58) Field of Classification Search .............. 423/610
See application file for complete search history.

(56) References Cited

U.S. PATENT DOCUMENTS

| | | | | |
|---|---|---|---|---|
| 2,448,683 | A | * | 9/1948 | Peterson ..................... 423/616 |
| 3,658,539 | A | * | 4/1972 | Dantro ..................... 430/495.1 |
| 4,036,784 | A | | 7/1977 | Gembicki et al. |
| 4,098,874 | A | | 7/1978 | Mitsche et al. |
| 4,212,771 | A | | 7/1980 | Hamner |
| 5,759,948 | A | * | 6/1998 | Takaoka et al. ............... 502/325 |
| 5,958,985 | A | | 9/1999 | Geerlings et al. ............. 518/700 |

FOREIGN PATENT DOCUMENTS

| | | |
|---|---|---|
| AU | 698392 | 10/1998 |
| CA | 2321250 | 2/1998 |
| EP | 0371329 | 6/1990 |
| EP | 0 412614 | 2/1991 |
| EP | 0666107 | 8/1995 |
| GB | 436224 | 10/1935 |
| GB | 1295474 | 11/1972 |
| JP | 54-45316 | 4/1979 |
| JP | 54045316 | 4/1979 |
| JP | 55-7597 | 1/1980 |
| JP | 60-235643 | 11/1985 |
| JP | 60235643 | 11/1985 |
| JP | 63-126549 | 5/1988 |
| JP | 63126549 | 5/1988 |
| JP | 2002877 | 1/1990 |
| JP | 2042029 | 2/1990 |
| NO | 171893 | 2/1993 |
| SE | 228804 | 2/1948 |
| WO | 99/34917 | 7/1999 |
| WO | WO9941200 | 8/1999 |

OTHER PUBLICATIONS

Ullmann's Encyclopedia of Industrial Chemistry, 5$^{th}$ Edition, vol. A7, pp. 308-309.

Ullmann's Encyclopedia of Industrial Chemistry, 5$^{th}$ Edition, vol. A20, pp. 271-281.

* cited by examiner

*Primary Examiner* — Jessica L Ward
*Assistant Examiner* — Paul Wartalowicz

(57) ABSTRACT

The invention relates to a process for the purification of titania by treating the titania with an aqueous solution having one or more ammonium compounds at elevated temperatures, separating the titania from the aqueous solution, drying the titania and, optionally, calcining the dried titania. More especially the invention relates to the removal of sulphur (mainly present in the form of sulphate compounds) from the titania. The titania purified according to the above process is especially suitable for use as a catalyst carrier.

10 Claims, No Drawings

PURIFICATION OF TITANIA

FIELD OF THE INVENTION

The present invention relates to a process for the purification of titania by washing the titania with an aqueous solution separating the titania and the washing liquid, and drying the titania. More especially, the invention relates to the removal of sulphur (mainly present in the form of sulphate compounds) from the titania.

BACKGROUND OF THE INVENTION

The use of pigments in paints, varnishes, printing inks, building materials, rubbers, etc. is well known. Organic as well as inorganic compounds have been widely used as colouring materials. Usually a pigment consists of (very) small particles which are practically insoluble in the applied medium, this in contrast to dyes, which are soluble in the applied medium.

The main white inorganic pigment is titania (or titanium dioxide). Two processes are used to prepare titania on a commercial scale. See for instance Ullmann's Encyclopedia of Industrial Chemistry, Fifth edition, Vol. A20, pages 271-281.

In the "chloride process" titanium containing raw materials as ilmenite, leucoxene, natural and synthetic rutile, titanium slag and anatase are chlorinated at 700-1200° C. Titanium tetra chloride is separated from the other chlorides by distillation. The titanium tetra chloride, optionally after further purification, is burnt with an oxygen containing gas at temperatures between 900 and 1400° C. to form titania. The pigment obtained in this way is very pure. Depending on the type of application some further treatment may be necessary.

In the other process, the "sulphate process", the titanium raw material, especially ilmenite and titanium slag, are dissolved in concentrated sulphuric acid at 150-220° C. Removal of insolubles and precipitation of iron sulphates results in a concentrated titanyl sulphate solution. Relatively pure titania dihydrate (also called "mesa titanic acid") is precipitated by hydrolysis of the sulphate solution at about 100° C. The remaining impurities, especially metal sulphates, are largely removed in further purification stages, especially by washing with diluted acid and by bleaching. The hydrate is filtered (usually using a rotary vacuum filter) until a titania (anhydrous $TiO_2$) content of 30-40 wt % is obtained, calcined, ground and further treated, depending on the type of application. Calcination (suitably at a temperature below 1000° C., especially between 400 and 700° C., 0.1 to 3 hours) is usually carried out in rotary kilns. Approximately two-thirds of the residence time (often 7-20 h in total) is needed to dry the material. Above 500° C., sulphur trioxide is driven off which partially decomposes to sulphur dioxide and oxygen at higher temperatures. In another form of the process the obtained titania hydrate is suspended in water and spray dried, optionally followed by calcination.

Beside the use of titania as a pigment, there are also other applications. One other application of titania is the use as catalyst carrier. A problem in the use of titania as catalyst carrier, especially with titania produced in the sulphate process, is the high content of sulphur, especially sulphate, in the titania. The presence of sulphur, either as adsorbed sulphuric acid or in the form of metal sulphates or in any other form, is often detrimental to the performance of the catalyst prepared from the titania carrier. The activity, the selectivity and/or the stability the may be negatively affected. In a number of cases the regeneration by means of hydrogen treatment results in the formation of hydrogensulphide, which negatively affects catalyst performance.

SUMMARY OF THE INVENTION

It has now been found that treating titania at elevated temperature with an aqueous solution comprising one or more ammonium compounds, followed by separation of the titania from the aqueous solution and drying the titania, results in a (further) purified titania, in which at least the sulphur content is considerably decreased. In addition, also the amount on unwanted metal (metals other than titanium, especially iron and sodium) may be considerably decreased.

The present application is relates to a process for the purification of calcined titania by treating the titania with an aqueous solution comprising one or more ammonium compounds at elevated temperatures, separating the titania from the aqueous solution and drying the titania.

DETAILED DESCRIPTION OF THE INVENTION

The present invention is especially suitable for titania made via the sulphate process. The titania prepared according to this process, and commercially available on the market, generally contains between 0.4 and 2 wt % sulphur (calculated as elemental sulphur). In the process according to the present invention the titania may be treated once or more than once. In general, after each treatment (washing and separation) the amount of sulphur is reduced by 20 to 98%. After a certain number of treatments it appears that the remainder amount of sulphur (calculated as elemental sulphur), usually 0.02 to 0.04 wt %, does not decrease any more. It is believed that the remaining amount of sulphur is incorporated in the inside of the primary particles, and cannot be removed by a simple washing method. The amount of sodium is usually decreased by 50-90 wt %, the amount of iron is usually decreased by 10-80 wt %.

As indicated above, the titania may have been prepared via precipitation, purification of the precipitate, filtration and calcination. In a modified process, the titania may have been prepared by spray drying or by flash drying the purified precipitate, especially a newly formed slurry of the filtered precipitate, optionally followed by calcination.

Titania that may be used in the process of the present invention is generally commercially available. Usually the titania contains at least 90 wt % $TiO_2$, preferably 95 wt %, more preferably between 96 an 99 wt % $TiO_2$. The size of the agglomerates is not essential, but is suitably between 1 and 200 micron, more suitably between 3 and 30 micron. Larger or smaller agglomerates can also be used, but in view of the efficiency of the washing stage and of the required separation step, are less desired. Generally, the titania has been calcined before purification at temperatures of at least 300° C., preferably 500° C. Anatase, rutile as well as all kind of mixtures or intermediates may be used. The amount of sulphur may be (calculated as elemental sulphur) between 0.2 and 4 wt %, preferably between 0.3 and 3 wt %. Preferably 90% of the sulphur is removed, more preferably 95%, in one or more washing steps.

The treatment of the titania with the aqueous solution may suitably be carried out by stirring the two components. Batch processes as well as continuous processes are possible. To minimize the amount of liquid, the washing treatment is preferably carried out counter-currently. Typically, the washing treatment is carried out at a liquid/solid volume ratio of at least 0.4, preferably of from 0.7 to 20, more preferably of from 1 to 5. Stirred tank reactors may be used. Titania and/or washing liquid may be added continuously and/or batchwise. Suspension may be removed continuously and/or batchwise. In addition to stirred tank reactors, pipe shaped washing equipment, with relatively small backmixing, may also be used. Leaching types of processes may also be used. The pH of the washing liquid is preferably between 8 and 11, more preferably 9.

In a preferred embodiment, the titania is washed with pure water after the washing treatments with the aqueous ammonium solution. This facilitates the calcination step as less undesired materials has to be burnt off and/or purer product is obtained. If desired, the washing treatment with the ammonium solution may be preceded by a washing with pure water and/or by a pre-wetting or filling of the pore volume of the titania by impregnation with a suitable liquid, e.g. pure water or, preferably, an aqueous ammonium solution.

The washing treatment in the process of the present invention may suitably be carried out at an elevated temperature between 40° C. and 150° C., preferably between 60° C. and 110° C., more preferably between 80° C. and 95° C. The washing treatment step is suitably be carried out between 0.01 and 12 hours, preferably between 0.1 and 2 hours, more preferably between 0.2 and 1.2 hours.

In a preferred embodiment, several washing treatments are carried out in order to remove the sulphate as much as possible. Each washing treatment may be followed by a calcination stage, but this is not preferred. Preferably the amount of washings (followed by separation of the titania and the aqueous solution) is up to 6, preferably 2 or 3. The washing treatment is preferably carried out at ambient pressure. When required by the temperature, higher pressures may be used.

The washing treatment may also be carried out with an aqueous wash comprising a mixture of water and one or more water-miscible organic compounds. The water-miscible organic compounds may be, for example, an alcohol, preferably an alcohol having from 1 to 10 carbon atoms, more preferably an alcohol having from 1 to 4 carbon atoms, especially methanol or ethanol. In general, at least 50 wt % of the aqueous wash solution will be water, preferably at least 70 wt %.

The ammonium compound to be used in the present process may suitably be derived from a trialkyl ammonium compound, a dialkyl ammonium compound, an alkyl ammonium compound or an unsubstituted ammonium compound, preferably an unsubstituted ammonium compound. Also aromatic and/or alkyl/aromatic ammonium compounds may be used, but the preference is for alkyl ammonium compounds, or, most preferred, unsubstituted ammonium. More specifically, the above mentioned alkyl groups suitably comprise 1 to 12 carbon atoms, preferably 1 to 6, more preferably 1 to 3. The above-mentioned aromatic compounds are suitably phenyl or benzyl groups (especially mono or di-alkyl ($C_1$ to $C_6$, especially $C_1$) substituted), preferably phenyl or benzyl. The ammonium compound may further be suitably derived from an organic acid, an inorganic acid or salts thereof. More especially, the organic acid is selected from the group consisting of alkanoic acids having 1 to 12 carbon atoms, preferably 1 to 6 carbon atoms, more preferably 2 carbon atoms, dicarboxylic acids having 1 to 12 carbon atoms, preferably 1 to 6 carbon atoms, said alkanoic and dicarboxylic acids optionally being substituted by one or more alkoxy groups having less than 5 carbon atoms, hydroxy groups and cyano groups, hydrogen fluoride, hydrogen chloride, hydrogen bromide, nitric acid, nitrous acid and (per)chloric acid. In a particularly preferred embodiment of the invention, the ammonium compound is derived from formic acid, acetic acid, succinic acid, glutaric acid, phthalic acid, nitric acid or hydrogen chloride. Most preferably the ammonium compound is ammonium acetate or ammonium chloride. In the case of ammonium_chloride, Fischer-Tropsch (FT) catalysts may be made having substantially the same performance as catalyst based on titania made by the chloride process.

In the present process, the concentration of the ammonium compound may suitably be in the range of from 0.01 to 5.0 M, preferably between 0.1 and 2 M. Further, the molar ratio of ammonium compound and titania may be between 0.01 and 1, preferably about 0.5.

After the above described washing treatment, the washed product may suitably be separated from the aqueous solution. This may be done by methods known in the literature. Plate filters, centrifugal filters, pressure filters, vacuum filters etc. may be used. Part of the liquid may be removed after gravity settling of the titania, followed by further treatment. Continuous processes as well as batch processes may be used. After the filtration the titania may be further dried, and, optionally, calcined. Alternatively, the filter cake may be washed with water, especially at a temperature between 30° C. and 70° C., which results in a further improvement of the selectivity in the Fischer-Tropsch (FT) hydrocarbon synthesis reaction. An amount of 5 to 100 l water/kg titania is preferred. Drying may suitably be carried out using commercially available equipment known to one man skilled in the art at temperatures between 30° C. and 250° C. Calcination is carried out in standard equipment well known to the man skilled in the art. The final temperature is at most 1000° C., preferably between 400° C. and 700° C. Suitable calcination times are between 0.1 and 3 hours, especially about 0.5 hours.

In another embodiment, the titania, after removal of the washing solution, may be slurried with a certain amount of water, followed by flash drying or by spray drying, and, optionally, calcination. The flash and spray drying may be done with standard equipment, known to one man skilled in the art. The drying is suitably carried out at inlet temperatures between 1000° C. and 350° C., preferably between 850° C. and 400° C. Suitable pressures range from 0.5 to 0.01 bar. Calcination may be carried out in standard equipment known to one man skilled in the art. The final temperature may be at most 1500° C., preferably between 400° C. and 700° C. Suitable calcination times are between 0.1 and 3 hours.

The washing treatment of the present invention when applied to titania for catalyst carriers is particularly useful when applied to improve the selectivity, activity and/or stability of catalysts comprising at least one metal or metal compound selected from Groups Ib, IIb, IIIb, IVb, VIb, VIIb and VIII of the Periodic Table of Elements, more preferably from Groups IVb, VIb and VIII, especially titanium, chromium, iron, cobalt, nickel, zirconium, ruthenium, rhodium, palladium, rhenium and platinum, especially iron and/or cobalt. This applies in particular when the washing is done at a pH of 7 or more, especially between 8 and 11, more especially 9. The pH may be increased by addition of the hydroxy compounds of the above mentioned ammonium compounds. In particular alkyl-, dialkyl-, or trialkyl-ammonium hydroxides may be used, with ethyl or methyl in particular as the alkyl groups. The most preferred compound is ammonium hydroxide. Alkali metal hydroxides (NaOH or KOH) may also be used, especially when the washing is followed by a washing with water. However, traces of alkali metals may cause negative effects in some cases.

The surface area of the titania after washing and optional calcinations may suitably be between 20 $m^2/g$ and 250 $m^2/g$, preferably between 30 $m^2/g$ and 80 $m^2/g$. Suitable adjustment of the temperature of the drying and/or calcination process may result in the desired surface area. It is observed in this respect that higher calcination temperatures or longer calcination times results in a lower surface area.

The washed and dried titania, optionally after calcination may very suitably be used for the preparation of catalysts, especially catalysts suitable for the preparation of hydrocarbons including waxes, from synthesis gas, a reaction which is known in the literature as the Fischer-Tropsch reaction.

Catalysts for use in this process frequently comprise, as the catalytically active component, a metal from Group VIII of the Periodic Table of Elements. Particular catalytically active metals include ruthenium, iron, cobalt and nickel. Cobalt is a preferred catalytically active metal. Preferred hydrocarbonaceous feeds for the preparation of synthesis gas are natural gas and/or associated gas. As these feedstocks, after partial oxidation and or steam reforming, usually result in synthesis gas having $H_2/CO$ ratios of about 2, cobalt is a very good Fischer-Tropsch catalyst as the user ratio for this type of catalysts is also about 2.

The catalytically active metal is preferably supported on a porous carrier, especially titania as prepared according to the process of the present invention.

The amount of catalytically active metal on the carrier is preferably in the range of from 3 to 300 pbw per 100 pbw of carrier material, more preferably from 10 to 80 pbw, especially from 15 to 60 pbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are very suitable promoters. Particularly preferred metal oxide promoters for the catalyst are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst may suitably be in the range of from 0.01 to 100 pbw, preferably 0.1 to 40, more preferably 1 to 20 pbw, per 100 pbw of carrier. The most preferred promoters are selected from vanadium, manganese, rhenium, zirconium and platinum.

The catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200° C. to 350° C. Other processes for the preparation of Fischer-Tropsch catalysts comprise kneading/mulling, often followed by extrusion, drying/calcination and activation, or kneading/mulling followed by the preparation of a slurry, spray drying and calcination.

The catalytic conversion process or Fischer-Tropsch reaction, may be performed under conventional synthesis conditions known in the art. Typically, the catalytic conversion may be effected at a temperature in the range of from 150° C. to 300° C., preferably from 180° C. to 260° C. Typical total pressures for the catalytic conversion process are in the range of from 1 to 200 bar absolute, more preferably from 10 to 70 bar absolute. In the catalytic conversion process especially more than 75 wt % of $C_5+$, preferably more than 85 wt % $C_5+$ hydrocarbons are formed. Depending on the catalyst and the conversion conditions, the amount of heavy wax ($C_{20}+$) may be up to 60 wt %, sometimes up to 70 wt %, and sometimes even up to 85 wt %. Preferably a cobalt catalyst is used, a low $H_2/CO$ ratio is used (especially 1.7, or even lower) and a low temperature is used (190-230° C.). To avoid any coke formation, it is preferred to use an $H_2/CO$ ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955. Preferably the Fischer-Tropsch hydrocarbons stream comprises at least 35 wt % $C_{30}+$, preferably 40 wt %, more preferably 50 wt %.

Preferably, a Fischer-Tropsch catalyst is used which yields substantial quantities of paraffins, more preferably substantially unbranched paraffins. A most suitable catalyst for this purpose is a cobalt-containing Fischer-Tropsch catalyst. Such catalysts are described in the literature, see e.g. AU 698392 and WO 99/34917.

The Fischer-Tropsch process may be a slurry FT process or a fixed bed FT process, especially a multitubular fixed bed, preferably a three phase fluidised bed process.

The invention is further illustrated by the following examples, which, however, should not be used to restrict the scope of the invention in any way.

EXAMPLE 1

Commercially available titania is washed for 1 hour at 90° C. with a 1 M solution of ammonium acetate in water. Weight ratio aqueous solution/titania: 4. After separation, drying at 120° C. and calcination at 600° C. the amount of sulphur was measured. The same process was repeated several times using several washing treatments. The results are summarised in Table 1.

|  | Sulphur content (wt %) |
| --- | --- |
| Non washed titania: | 0.240 |
| 1 washing treatment | 0.040 |
| 2 washing treatments | 0.040 |
| 3 washing treatments | 0.030 |
| 10 washing treatments | 0.030 |

In three comparison experiments in which the titania was washed with water, sulphuric acid and hydrochloric acid only a minimal decrease of the sulphur content was observed.

EXAMPLE 2

Experiment 1 was repeated at a temperature of 120° C. in an autoclave. The results are summarised in Table 2.

|  | Sulphur content (wt %) |
| --- | --- |
| Non washed titania: | 0.240 |
| 1 washing treatment | 0.035 |
| 2 washing treatments | 0.030 |

EXAMPLE 3

Experiment 1 was repeated using a commercially available titania from another manufacturer. The results are summarised in Table 3.

|  | Sulphur content (wt %) |
|---|---|
| Non washed titania: | 0.750 |
| 3 washing treatments | 0.060 |

EXAMPLE 4

Experiment 1 was repeated using a commercially available titania from another manufacturer. The results are summarised in Table 4.

|  | Sulphur content (wt %) |
|---|---|
| Non washed titania: | 0.160 |
| 3 washing treatments | 0.050 |

EXAMPLE 5

The non washed material as described in Example 1, the material washed three times as described in Example 1 and material washed three times with ammonium chloride in the same way as described in Example 1 were provided with similar amounts of cobalt oxide promoted by manganese. After activation with hydrogen, the following results were obtained in the Fischer-Tropsch hydrocarbon synthesis:

|  | Temperature | STY | $C_5$ + sel | $C_1$ sel |
|---|---|---|---|---|
| Unwashed material | 219 | 22 | 43 | 27 |
| Washed (3*, $NH_4$ acetate) | 223 | 156 | 88 | 6 |
| Washed (3*, $NH_4$ chloride) | 209 | 79 | 84 | 7 |
| Washed (1*, $NH_4Cl$, pH = 9) | 222 | 157 | 87 | 6 |

The above results indicate that the activity (expressed as Space Time Yield) and the selectivity ($C_5$+ selectivity and methane make) considerably increase by the washing treatments.

We claim:

1. A process for the purification of calcined titania comprising treating the titania with an aqueous solution comprising one or more ammonium compounds at elevated temperatures to remove impurities, separating the titania from the aqueous solution and drying the titania.

2. The process of claim 1, in which the titania has been prepared via the sulphate process.

3. The process of claim 1, in which the elevated temperature is a temperature between 40° C. and 150° C.

4. The process of claim 1, in which the treatment step is carried out between 0.01 and 12 hours.

5. The process of claim 1, in which the ammonium compound is derived from a trialkyl ammonium compound, a dialkyl ammonium compound, an alkyl ammonium compound or an unsubstituted ammonium compound.

6. The process of claim 1, in which the concentration of the ammonium compound is in the range of from 0.01 to 5.0 M, or in which the molar ratio of ammonium compound and titania is between 0.01 and 1.

7. The process of claim 1, in which the ammonium compound is derived from an acid selected from the group consisting of alkanoic acids having 1 to 12 carbon atoms, dicarboxylic acids having 1 to 12 carbon atoms, hydrogen fluoride, hydrogen chloride, hydrogen bromide, phosphoric acid, phosphorous acid, nitric acid, chloric acid and perchloric acid.

8. The process of claim 1, in which the ammonium compound is derived from an alkanoic acid, having 1 to 12 carbon atoms, substituted by one or more alkoxy groups having less than five carbon atoms, hydroxyl groups and/or cyano groups.

9. The process of claim 1, in which the ammonium compound is derived from a dicarboxylic acid, having 1 to 12 carbon atoms, substituted by one or more alkoxy groups having less than five carbon atoms, hydroxyl groups and/or cyano groups.

10. The process of claim 1, in which the ammonium compound comprises ammonium acetate or ammonium chloride.

* * * * *